US00RE36513E

United States Patent [19]

Aitken et al.

[11] E Patent Number: Re. 36,513

[45] Reissued Date of Patent: Jan. 18, 2000

[54] GALLIUM SULFIDE GLASSES

[75] Inventors: Bruce G. Aitken; Mark A. Newhouse, both of Corning, N.Y.

[73] Assignee: Corning Inc., N.Y.

[21] Appl. No.: 08/775,706

[22] Filed: Dec. 17, 1996

Related U.S. Patent Documents

Reissue of:

[64] Patent No.: 5,392,376
Issued: Feb. 21, 1995
Appl. No.: 08/225,767
Filed: Apr. 11, 1994

[51] Int. Cl.[7] ..... C03C 3/23; C03C 4/10; C03C 13/04

[52] U.S. Cl. ..... 385/144; 501/40; 501/904; 501/35; 501/37; 428/373; 385/142

[58] Field of Search ..... 385/144, 142; 428/373; 501/40, 904, 35, 37

[56] References Cited

U.S. PATENT DOCUMENTS

| | | | |
|---|---|---|---|
| 3,214,241 | 10/1965 | Forber et al. | 23/134 |
| 4,188,089 | 2/1980 | Gliemeroth et al. | 385/144 |
| 4,612,294 | 9/1986 | Katsuyama et al. | 501/40 |
| 4,704,371 | 11/1987 | Krolla et al. | 501/40 |
| 4,942,144 | 7/1990 | Martin | 501/40 |
| 5,240,885 | 8/1993 | Aitken et al. | 501/40 |

FOREIGN PATENT DOCUMENTS

| | | |
|---|---|---|
| 1209925 | 3/1985 | Japan . |
| 1 135 726 | 1/1985 | U.S.S.R. . |
| 1 402 913 | 6/1988 | U.S.S.R. . |
| 1 715 725 | 2/1992 | U.S.S.R. . |

OTHER PUBLICATIONS

Carcaly, et al., "Verres de Sulfures de Terres Rares Conducteurs Ioniques," *Mat. Res. Bull.* 15(5):545–50 (1980) no month.

Cervelle, et al., "Variation, Avec la Composition, Des Indices de Refraction des Verres de Sulfures de Lanthane et de Gallium et Indices de Quelques Verres Apparentes," *Mat. Res. Bull.* 15(2):159–64 (1980) no month.

Flahaut, "Verres de Sulfures de Terres Rares," *Verres Refract.* 35(4):671–74 (1981) no month.

Barnier, et al., "Etude de Verres de Chalcogenures Contenant de L'Europium Divalent Systeme EuS–$Ga_2S_3$–$GeS_2$," *Mat. Res. Bull.* 15(6):689–705 (1980) no month.

Julien, et al., "Raman and Infrared Spectroscopic Studies of Ge–Ga–Ag Sulphide Glasses," *Materials Science and Engineering* B22(2–3):191–200 (1994) no month.

Baidakov, et al., "Thermal Expansion of $Ga_2S_3$–$GeS_2$–$PbF_2$ Glasses," *Soviet Journal of Glass Physics and Chemistry* 18(1):91–92 (1992) no month.

Winterberger, et al., "Propriétés Magnétiques de Phases Amorphes de Composition 1,8 $Ga_2S_3$–$(LaGd)_2S_3$," *C.R. Acad. Sc. Paris* 292(7):563–66 (1981) no month.

Benazeth, et al., "An EXAFS Structural Approach of the Lanthanum–Gallium–Sulfur Glasses," *J. Non–Cryst. Solids* 110:89–110 (1989) no month.

Xilai et al., "Study of Ge–Ga–x(X=S,S3) Glass Systems," *Collected Papers XIV Intl. Congr. on Glass* 118–27 (1986) no month.

Guittard, et al., "Le Systeme $Ga_2S_3$–$Ag_2S$," *Ann. Chim.* 8:215–25 (1983) no month.

Loireau–Lozac'h, et al., "Verres Formes Par Les Sulfures $L_2S_3$ Des Terres Rares Avec Le Sulfure De Gallium $Ga_2S_3$," *Mat. Res. Bull.* 11:1489–96 (1976) no month.

Loireau–Lozac'h, et al., "Systeme $GeS_2$–$Ga_2S_3$ Diagramme De Phases Obtention Et Proprietes Des Verres," *Ann. Chim.* 10:101–04 (1975) no month.

Palazzi, "Etude Du Systeme $Ga_2S_3$–$Na_2S$," *C.R. Acad. Sc. Paris* 229(9):529–32 (1984) no month.

Baidakov, et al., "$^{19}F$ NMR Study of $[(Ga_2S_3)_{0.25}(GeS_2)_{0.75}]_{0.75}(NaF)_{0.25}$ Glass," *Soviet Journal of Glass Physics and Chemistry* 18(4):322–24 (1992) no month.

Orkina, et al., "Chalcogenide Glasses in $Ga_2S_3$–$GeS_2$–$MeF_n$ Systems," *Glass Physics and Chemistry* 19(3):228–34 (1993) no month.

Snitzer, et al., "Active Fiber Research Highlights," *Fiber Optics Materials Research Program,* Rutgers University, p. 32 (1993) no month.

Becker, et al., "$Pr^{3+}$:La–Ga–S Glass: A Promising Material for 1.3 $\mu$m Fiber Amplification," *Optical Amp. and Their Appl.* PD5:19–23 (1992) no month.

Barnier, et al., "Glass Formation and Structural Studies of Chalcogenide Glasses in the CdS–$Ga_2S_3$–$GeS_2$ System," *Materials Science and Engineering* B7(3):209–14 (1990) no month.

Chbani, et al., "An EXAFS Study of Sulfide Gallium Based Glasses," *The Physics of Non–Crystalline Solids* pp. 160–69 (1992) no month.

*Primary Examiner*—Melissa Bonner
*Attorney, Agent, or Firm*—Angela N. Nwaneri; Michael Goldman

[57] ABSTRACT

This invention is directed broadly to transparent glasses exhibiting excellent transmission far into the infrared region of the electromagnetic radiation spectrum, those glasses consisting essentially, expressed in terms of mole percent, of 40–80% $Ga_2S_3$, 0–35% $RS_x$, wherein R is at least one network forming cation selected from the group consisting of aluminum, antimony, arsenic, germanium, and indium, 1–50% $Ln_2S_3$, wherein Ln is at least one cation selected from the group consisting of a rare earth metal cation and yttrium, 1–45% $MS_x$, wherein M is at least one modifying metal cation selected from the group consisting of barium, cadmium, calcium, lead, lithium, mercury, potassium, silver, sodium, strontium, thallium, and tin, and 0–10% total chloride and/or fluoride. Glass compositions consisting essentially, expressed in terms of mole percent, of 5–30% $Ga_2S_3$, 0–10% $R_2S_3$, wherein R is at least one network forming cation selected from the group consisting of aluminum, antimony, arsenic, and indium, 55–94.5% $GeS_2$, 0.5–25% $MS_x$, wherein M is at least one modifying metal cation selected from the group consisting of barium, cadmium, calcium, lead, lithium, potassium, silver, sodium, strontium, tin, yttrium, and a rare earth metal of the lanthanide series, 0–10% total selenide, 0–25% total chloride and/or fluoride, and wherein the sulfur and/or selenium content can vary between 85–125% of the stoichiometric value when doped with Pr demonstrate exceptionally high values of $\tau$.

17 Claims, No Drawings

GALLIUM SULFIDE GLASSES

Matter enclosed in heavy brackets [ ] appears in the original patent but forms no part of this reissue specification; matter printed in italics indicates the additions made by reissue.

RELATED APPLICATION

U.S. Ser. No. 08/225,766, filed concurrently herewith by the present applicants under the title Ga- AND/OR In-CONTAINING AsGe SULFIDE GLASSES and assigned to the same assignee as the present application, is directed to glass compositions which, when doped with $Pr^{3+}$ ions, not only exhibit values of $\tau$ in excess of 300 $\mu$sec, but also glass working ranges greater than 150° C., with the preferred glasses demonstrating working ranges of about 200° C. and higher. The base glass compositions therefor consist essentially, expressed in terms of mole percent on the sulfide basis, of 55–95% $GeS_2$, 2–40% $As_2S_3$, 0.01–20% $R_2S_3$, wherein R is a trivalent network forming cation selected from the group of Ga and In, 0–10% $MS_x$, where M is a cation selected from the group consisting of Al, Li, Na, K, Ca, Sr, Ba, Ag, Hg, Tl, Cd, Sn, Pb, Y, and a rare earth metal of the lanthanide series, 0–5% total selenide, 0–20% total chloride and/or fluoride, and wherein the sulfur and/or selenium content can vary between about 85–125% of the stoichiometric value.

BACKGROUND OF THE INVENTION

U.S. Pat. No. 5,240,885 (Aitken et al) describes the preparation of rare earth metal-doped cadmium halide glasses, which glasses transmit radiation well into the infrared portion of the electromagnetic radiation spectrum due to their low phonon energy. That capability commended their utility for the fabrication of efficient lasers, amplifiers, and upconverters when doped with the appropriate rare earth metals. Because metal-sulfur bonds are generally weaker than metal-oxygen bonds, sulfide glasses exhibit much lower phonon energies than oxide glasses and, therefore, transmit radiation much further into the infrared region of the electromagnetic radiation spectrum. Accordingly, sulfide glasses were seen to have the potential of being excellent host materials of rare earth metals for applications such as those listed above requiring efficient radiative emission.

Unfortunately, however, many sulfide glasses are black and, consequently, are unsuitable for some of the above applications inasmuch as such a host glass would tend to absorb the pump radiation instead of the rare earth metal dopant. One of the best known sulfide glasses, viz., arsenic sulfide, is transparent to radiation in the long wavelength range of the visible portion of the radiation spectrum as well as far into the infrared region and, hence, would appear to be a suitable host glass for rare earth metals. Nevertheless, rare earth metals have been found to be relatively insoluble in arsenic sulfide glasses, and it has proven to be difficult to dope those glasses with enough rare earth metal for sufficient pump power absorption.

Rare earth metals are known to be very soluble in most oxide glasses and their apparent insolubility in arsenic sulfide glasses has been conjectured to be due to the gross structural dissimilarity existing between the latter and oxide glasses. Arsenic sulfide glasses are believed to consist of long chains and layers of covalently bonded pyramidal $AsS_3$ groups, whereas oxide glasses typically comprise a three-dimensional network of relatively ionically bonded $MO_4$ tetrahedra, where M is a so-called network-forming metal such as silicon, phosphorus, aluminum, boron, etc. Rare earth metals are readily accommodated in these ionic network structures where they can compensate charge imbalances that arise from the presence of two or more network-forming metals, e.g., aluminum and silicon in aluminosilicate glasses—energetically similar sites may not exist in the two-dimensional covalent structures typical of arsenic sulfide and related glasses.

One system of sulfide glasses which exhibit good transparency in both the visible and infrared portion of the radiation spectrum, and which possess a relatively ionic three-dimensional structure that would be expected to be more accommodating of rare earth metals, comprises gallium sulfide glasses. In contrast to arsenic sulfide glasses, the structure of these glasses is based upon a three-dimensional linkage of corner sharing $GaS_4$ tetrahedra. Rare earth metals are readily soluble in these glasses. In fact, some of the most stable gallium sulfide glasses contain a rare earth metal as a major constituent.

LITERATURE ARTICLES

["Verres Formes Par Les Sulfures $L_2S_3$ Des Terres Rares Avec Le Sulfure De Gallium $Ga_2S_3$", Loireau-Lozac'h et al, Mat. Res. Bull., 11, 1489–1496 (1976)]. Other academic studies of gallium sulfide-containing glasses have included the following publications: ["Systeme $GeS_2$—$Ga_2S_3$ Diagramme De Phases Obtention Et Proprietes Des Verres", Loireau-Lozac'h et al., Ann. Chim., 10, 101–104 (1975)]; ["Etude Du Systeme $Ga_2S_3$—$Na_2S$", Palazzi C. R. Acad. Sc. Paris, 229, Serie II, No. 9, 529–532 (1984)]; ["Study on Ge—Ga—x(X=S,Se) Glass Systems", Xilai et al., Collected Papers, XIV Intl. Congr. on Glass, 118–127 (1986)]; ["Le Systeme $Ga_2S_3$—$Ag_2S$", Guittard et al., Ann. Chim. 8, 215–225 (1983)]; ["Am EXAFS Structural Approach of the Lanthanumallium-Sulfur Glasses", Benazeth et al., J. Non-Cryst. Solids, 110, 89–100 (1989)]; ["Glass Formation and Structural Studies of Chalcogenide Glasses in the CdS—$Ga_2S_3$—$GeS_2$ System", Barnier et al., Materials Science and Engineering, B7, 209–214 (1990)], {"F NMR Study of $[(Ga_2S_3)_{0.25}\ (GeS_2)_{0.75}]_{0.75}\ (NaF)_{0.25}$ Glass", Baidakov et al., Soviet Journal of Glass Physics and Chemistry, 18, No. 4, 322–324 (1992)}; ["Chalcogenide Glasses in $Ga_2S_3$—$GeS_2$—$MeF_n$ Systems", Orkina et al., Glass Physics and Chemistry, 19, No. 3 (1993)]; "Active Fiber Research Highlights", Snitzer et al., Fiber Optics Matenk. Research Program, Rutgers University, page 32 (April 13, 1993)]; and ["$Pr^{3+}$:La—Ga—S Glass: A Promising Material for 1.3 $\mu$m Fiber Amplification", Becker et al., Optical Amp. and Their Appl., PD5, 19–23 (1992).

SUMMARY OF THE INVENTION

The above listing of literature references is indicative of the extensive research which has been conducted in recent years in the general field of gallium sulfide-containing glass. That research disclosed properties exhibited by such glasses that suggested studies be undertaken to modify glasses having base compositions within the gallium sulfide system such that, when doped with rare earth metals, particularly neodymium, erbium, and praseodymium, they could be fabricated into very efficient lasers, amplifiers, and upconverters. Therefore, our invention was directed to developing glass compositions which are not only eminently suitable for those applications, but also which can be melted and formed into desired configurations utilizing standard glass melting and forming techniques.

GENERAL DESCRIPTION OF THE INVENTION

In view of the description in the last two citations in the above Literature Articles, we began our research by investigating the utility of gallium sulfide-based glasses as hosts of $Pr^{3+}$ ions, principally for the purpose of fabricating a fiber amplifier capable of exhibiting gain at a wavelength of 1.3 $\mu$m. The measured lifetime of the 1.3 $\mu$m fluorescence from $Pr^{3+}$ ($\tau$) is large in these glasses and, due to their large refractive index, the radiative emission process is about four times more efficient than in a Pr-doped halide glass with the same $\tau$. In order to produce a fiber amplifier, one must be able to control the refractive index of the material in such a manner as to form a waveguide structure typically consisting of a core glass demonstrating a high refractive index surrounded by a cladding glass of lower refractive index.

The refractive index of lanthanum gallium sulfide glass is about 2–5 and our experiments indicted that the index appears to be rather insensitive to variations in the La:Ga ratio, as will be seen in Table I infra. We have discovered, however, that the refractive index thereof can be lowered substantially by partially replacing lanthanum with at least one modifier selected from the group calcium, sodium, and potassium. On the other hand, we have found that the partial replacement of lanthanum with other rare earth metals, in particular gadolinium, can lead to a significant increase in the refractive index, as will also be seen in Table I infra. Such replacements can, in principle, allow one to achieve a core/clad structure with a numerical aperture well in excess of 0.4. From a practical point of view, calcium-substituted glasses are preferred for the cladding where the core glass is a Pr-doped lanthanum gallium sulfide glass, inasmuch as the other relevant physical properties of the calcium-substituted glasses, e.g., thermal expansion and viscosity, more closely match those of the core glass. Thus, as is reported in Table I infra, a calcium-substituted glass exhibits a linear coefficient of thermal expansion over the temperature range of 25°–300° C. of about $95\times10^{-7}$/° C. which closely matches the linear coefficient of thermal expansion of about 90–100$\times10^{-7}$/° C. exhibited by lanthanum gallium sulfide glasses.

We have found that the compositional region over which gallium sulfide glasses can be formed is quite extensive. To illustrate, not only is there a broad glass forming region in the $La_2S_3$—$Ga_2S_3$ system from about 50–80 mole percent $Ga_2S_3$, but also lanthanum can be replaced, in some instances completely, by other modifying cations including Ag, Sr, Li, Cd, Na, Hg, K, Pb, Ca, Tl, Ba, Sn, Y, and the other rare earth metals of the lanthanide series. The use of substantial amounts of La and/or Gd as modifiers in Pr-doped glasses has been theorized to suppress the tendency of Pr to cluster, thereby permitting higher dopant levels of Pr without compromising $\tau$. In addition, the network forming component Ga can be replaced in part by other tetrahedrally coordinated metals such as Al, Ge, and In, or by pyramidally coordinated metals such as As and Sb. Examples of $Pr^{3+}$-doped and $Eu^{2+}$-doped glasses illustrating that compositional flexibility are recorded in Table I infra.

Finally, sulfide can be replaced in part by chloride without degrading the infrared radiation transmission of these glasses. Fluoridation of the glasses may lead to blueshifting the spectral lines of rare earth metal dopants and, in particular centering the $^1G_4$—$^3H_5$ emission of $Pr^{3+}$ at about 1.3 $\mu$m, in like manner to the effect which the replacement of oxide by fluoride has in rare earth metal-doped oxide glasses.

In summary, a transparent gallium sulfide-based glass exhibiting excellent transmission far into the infrared region of the electromagnetic spectrum can be prepared from compositions consisting essentially, expressed in terms of mole percent on the sulfide basis, of 40–80% $Ga_2S_3$, 0–35% $RS_x$, wherein R is at least one network forming cation selected from the group consisting of aluminum, antimony, arsenic, germanium, and indium, 1–50% $Ln_2S_3$, wherein Ln is at least one cation selected from the group consisting of a rare earth metal and yttrium, and 1–45% $MS_x$, wherein M is at least one modifying cation selected from the group consisting of barium, cadmium, calcium, lead, lithium mercury, potassium, silver, sodium, strontium, thallium, and tin, and 0–10% total chloride and/or fluoride.

When glass having compositions encompassed within the above ranges are doped with $Pr^{+3}$ ions in an amount equivalent to at least 0.005 mole percent $Pr_2S_3$, they exhibit a $\tau$ value greater than 200 $\mu$sec. $Pr^{+3}$ ions in much larger amounts are operable, but a level equivalent to about 0.5% $Pr_2S_3$ has been deemed to constitute a practical maximum. It is also of interest to note that, in view of the large optical nonlinearity of these $Ga_2S_3$ glasses ($X_3$=~$45\times10^{-14}$ esu at 1.06 $\mu$m), they possess the necessary properties for making high $X_3$ waveguides.

Further laboratory investigation of gallium sulfide-based glasses discovered a composition system, viz., germanium gallium sulfide glasses, which can demonstrate exceptionally high values of $\tau$ along with a substantial improvement in thermal stability and increased transmission in the visible portion of the electromagnetic radiation spectrum. We have found that Pr-doped analogues of germanium gallium sulfide glasses have a $\tau$ as high as 362 $\mu$m, that value being, to the best of our knowledge, the largest ever recorded for any glass.

In addition to Pr-doped binary germanium gallium sulfide glass, we studied the optical and thermal properties of Pr-doped ternary glasses with the aim of synthesizing glasses with similarly high $\tau$, but improved thermal stability. As was shown to be the case for lanthanum gallium sulfide glasses, the region of glass formation is quite extensive when a third sulfide component is included. For example, modifying cations including barium, cadmium, calcium, lithium, potassium, silver, sodium, strontium, and tin can be added to broaden the field of stable glasses. Furthermore, either gallium or germanium can be partially replaced with other network forming cations such as aluminum, antimony, arsenic, and indium. Other components, such as lead, mercury, and thallium, can also be included to provide additional compositional flexibility, but their concentrations must be kept low so as not to degrade the visible transparency of the materials. Furthermore, in these Ge-rich, gallium sulfide glass systems, we have found it to be possible to form stable glasses when the sulfur content of the glass is either more than or less than that dictated by normal stoichiometry. In practice, the sulfur content should not be less than about 85% of the stoichiometric amount in order to avoid severely curtailing the transmission of the glass in the visible portion of the radiation spectrum, and should not exceed about 125% of the stoichiometric amount in order to avoid materials with excessively high coefficients of thermal expansion or with a pronounced tendency to volatile sulfur when reheated to an appropriate forming temperature. Finally, sulfur can be partially replaced with selenium, although the ratio Se:Se+S must be held below 0.1 in order to avoid significant darkening of the glass.

In summary, a germanium gallium sulfide-based glass exhibiting excellent transmission far into the infrared region of the electromagnetic spectrum can be prepared from compositions consisting essentially, expressed in terms of mole percent on the sulfide basis, of 5–30% $Ga_2S_3$, 0–10% $R_2S_3$, wherein R is at least one network forming cation selected from the group consisting of aluminum, antimony, arsenic, and indium, 55–94.5% $GeS_2$, 0.5–25% $MS_x$, wherein M is at least one modifying metal cation selected from the group consisting of barium, cadium, calcium, lead, lithium, mercury, potassium, silver, sodium, strontium, thallium, tin, yttrium, and a rare earth metal of the lanthanide series, 0–10% total selenide, 0–25% total chloride and/or fluoride, and where the sulfur and/or selenium content can vary between about 85–125% of the stoichiometric value.

When glasses having compositions included within the above ranges are doped with $Pr^{+3}$ ions in an amount equivalent to at least 0.005% $Pr_2S_3$, they exhibit a $\tau$ value typically greater than 300 $\mu$sec. Whereas much larger levels of $Pr^{+3}$ ions are operable, an amount equivalent to about 0.5% $Pr_2S_3$ has been considered to comprise a practical maximum.

As was observed above, the presence of a third sulfide component tends to broaden the working range of the binary germanium gallium sulfide glasses. Our laboratory work has demonstrated that these ternary sulfide glasses typically demonstrate working ranges between about 120°–170° C. It has been discovered that this stabilizing effect is maximized when barium is employed as a modifying cation. Thus, barium modified, germanium gallium sulfide glasses are unusually stable and can have an effective working range of about 200° C. There is a broad area of enhanced glass stability in the BaS—$Ga_2S_3$—$GeS_2$ system which provides a wide range of compositions suitable for drawing Pr-doped glass fiber exhibiting gain at 1.3 $\mu$m. Moreover, because the thermal expansion and viscosity of these barium-containing sulfide glasses are believed to be relatively stable, whereas the refractive index exhibits an increase with increased levels of barium, single mode waveguide fibers can be fabricated from core/cladding glass pairs which are thermally and mechanically compatible with sufficient differences in refractive index.

Finally, in like manner to the glass compositions in the gallium sulfide system described above, it is likewise possible to partially replace sulfide in these geranium gallium sulfide glasses with chloride and/or fluoride. Fluoridation is contemplated to shift the maximum of the $^1G_4 \rightarrow {}^3H_5$ emission from 1.34 $\mu$m to shorter wavelengths, so that the desired fluorescence is more closely centered in the transmission window of 1.3 $\mu$m optical fiber.

The general composition region of the inventive germanium gallium sulfide glasses consists essentially, expressed in terms of mole percent on the sulfide basis, of about 5–30% $Ga_2S_3$, 55–94.5% $GeS_2$, 0.5–25% $MS_x$, wherein M is a modifying cation which may be incorporated as a sulfide and/or chloride and/or fluoride, and 0–10% $R_2S_3$, wherein R is a network forming cation selected from the group of Al, As, In, and Sb. The preferred glasses contain barium as the modifying cation.

An effective waveguide structure comprises a core glass demonstrating a high refractive index surrounded by a cladding glass exhibiting a lower refractive index, the difference in those refractive indices being selected to achieve a desired numerical aperture. We have discovered three composition areas particularly suitable for the fabrication of waveguide structures.

The first area comprises a core glass consisting of a lanthanum gallium sulfide glass and a cladding glass consisting of a lanthanum gallium sulfide glass where calcium has replaced a sufficient proportion of the lanthanum to lower the refractive index thereof to a value appropriate to achieve the desired numerical aperture.

The second area comprises a cladding glass consisting of a lanthanum gallium sulfide glass and a core glass consisting of a lanthanum gallium sulfide glass wherein gadolinium has replaced a sufficient proportion of the lanthanum to raise the refractive index to a value appropriate to achieve the desired numerical aperture.

The third area comprises a core glass consisting of a barium-modified, germanium gallium sulfide glass and a cladding glass also consisting of a barium-modified, germanium gallium sulfide glass, but wherein the barium content of said core glass is sufficiently higher than the barium content of said cladding glass to impart a sufficient difference between the refractive index of said core glass and said cladding glass to achieve the desired numerical aperture.

PRIOR ART

In addition to the literature articles referred to above, the following patents are believed to be relevant to the subject inventive glasses.

U.S. Pat. No. 4,612,294 (Katsuyama et al.) is directed to infrared transmitting glasses for use in optical fibers wherein the glasses are selected from the group of selenium-germanium, selenium-germanium-antimony, and selenium-arsenic-germanium, in which from 2 to 100 ppm of at least one of aluminum, gallium, and indium is incorporated. The high levels of selenium and the very low concentrations of gallium place the glasses far outside of the operable ranges of the subject inventive glasses.

U.S. Pat No. 4,704,371 (Krolla et al.) discloses broadly glasses suitable for transmitting infrared radiation, the glasses comprising, in atom percent, 5–50% germanium, 25–94% selenium, 0.5–10% alkaline earth metal, 0–28% antimony, and 0–70% other, the other being one or more of P, As, Bi, S, Te, Br, I, In, Tl, Ga, Si, Sn, Pb, Ca, Ag, and Sr. The high levels of selenium immediately place this disclosure outside of the composition intervals of the present inventive glasses.

U.S. Pat No. 4,942,144 (Martin) is concerned with infrared transmitting glasses consisting of compositions within the formula $MX+M^1{}_2X_3+SiX_2$, wherein M is a metal selected from the group barium, calcium, lead, strontium, and zinc, $M^1$ is either aluminum or gallium, and X is either sulfur, selenium, or tellurium. In mole percent, MX is present within 5–70% $M^1{}_2X^3$ is present within 5–70%, and $SiX_2$ is present within 10–90%. Germanium can replace silicon. The two working examples provided contained large concentrations of silicon, thereby placing the disclosure outside of the present inventive glass compositions.

DESCRIPTION OF PREFERRED EMBODIMENTS

Table I records a group of glass compositions, expressed in terms of mole percent, illustrating glasses in the basic gallium sulfide system. Most of the glasses were doped with $Pr^{3+}$ ions to determine the level of $\tau$. Because the glasses were prepared in the laboratory, a sulfide was used for each component. Such is not necessary, however. Thus, sulfur-containing batch materials other than sulfides can be utilized so long as the chosen materials, upon melting together with the other batch ingredients, are converted into the desired sulfide in the proper proportions.

The glasses were prepared by compounding the batch constituents, thoroughly mixing the constituents together to aid in securing a homogeneous glass, and then dispensing the batch mixtures into vitreous carbon or alumina crucibles. The crucibles were moved into a furnace operating at about 1000°–1100° C., maintained at that temperature for about 15–60 minutes, the melts thereafter poured into steel molds to form discs having a diameter of 4 cm and a thickness of 5 mm, and those discs transferred immediately to an annealer operating at about 500°–550° C.

Table I also recites the density (Den.), expressed in terms of g/cm$^3$, the transition temperature ($T_g$) and the temperature of the onset of crystallization ($T_x$), expressed in terms of °C. the refractive index ($N_D$), the linear coefficient of thermal expansion ($\alpha$) expressed in terms of X $10^{-7}$/° C., and the $\tau$ values, expressed in terms of $\mu$sec, of each glass where measured.

TABLE I

| | 1 | 2 | 3 | 4 | 5 | 6 | 7 | 8 |
|---|---|---|---|---|---|---|---|---|
| $Ga_2S_3$ | 65.00 | 70.00 | 65.00 | 65.00 | 70.00 | 70.00 | 70.00 | 48.80 |
| $La_2S_3$ | 24.95 | 19.97 | 24.95 | 14.95 | 19.97 | 9.97 | 19.97 | 20.85 |
| $Li_2S$ | 10.00 | — | — | — | — | — | — | — |
| $Na_2S$ | — | 10.00 | 10.00 | 20.00 | — | — | — | — |
| $K_2S$ | — | — | — | — | 10.00 | 20.00 | — | — |
| CaS | — | — | — | — | — | — | 10.00 | — |
| GeS | — | — | — | — | — | — | — | 30.30 |
| $Pr_2S_3$ | 0.05 | 0.03 | 0.05 | 0.05 | 0.03 | 0.03 | 0.03 | 0.05 |
| Den. | — | 3.74 | 3.80 | 3.51 | 3.68 | 3.30 | 3.84 | — |
| $T_g$ | — | 528 | 534 | 520 | 540 | 524 | 536 | — |
| $T_x$ | — | 683 | 627 | 634 | 691 | 632 | 667 | — |
| $n_D$ | — | 2.31 | — | — | 2.29 | 2.22 | 2.38 | — |
| $\tau$ | 208 | — | 242 | 240 | — | — | — | 228 |
| | 9 | 10 | 11 | 12 | 13 | 14 | 15 | 16 |
| $Ga_2S_3$ | 65.00 | 65.00 | 65.00 | 52.50 | 65.00 | 65.00 | 65.00 | 65.00 |
| $La_2S_3$ | 24.95 | 14.95 | 29.95 | 29.95 | 34.90 | 34.00 | 24.95 | 17.45 |
| CaS | 10.00 | 20.00 | — | — | — | — | — | — |
| BaS | — | — | 5.00 | — | — | — | — | — |
| $In_2S_3$ | — | — | — | 17.50 | — | — | — | — |
| EuS | — | — | — | — | 0.10 | 1.00 | — | — |
| $Gd_2S_3$ | — | — | — | — | — | — | 10.00 | 17.50 |
| $Pr_2S_3$ | 0.05 | 0.05 | 0.05 | 0.05 | — | — | 0.05 | 0.05 |
| Den. | 3.85 | — | — | — | — | 4.06 | 4.15 | 4.22 |
| $T_g$ | 536 | — | — | — | — | — | 549 | 541 |
| $T_x$ | 638 | — | — | — | — | — | 658 | 657 |
| $n_D$ | — | — | — | — | — | — | — | 2.60 |
| $\tau$ | 224 | — | — | — | — | — | 218 | 212 |
| $\alpha$ | 94.5 | — | — | — | — | — | — | — |

Table II records a further group of glass compositions, expressed in terms of mole percent, illustrating glasses having compositions composed of $GeS_2$, $Ga_2S_3$, and at least one modifying metal cation being included as a sulfide and/or a chloride and/or a fluoride. Table IIa recites the same glass compositions in terms of atomic percent. Similarly to the glass compositions recited in Tables I and II, most of the glasses were doped with $Pr^{3+}$ ions to determine the level of $\tau$. The glasses were typically prepared by melting mixtures of the respective elements, although in some cases a given metal was batched as a sulfide.

The batch materials were compounded, mixed together, and sealed into silica or VYCOR® ampoules which had been evacuated to about $10^{-5}$ to $10^{-6}$ Torr. The ampoules were placed into a race designed to impart a rocking motion to the batch during melting. After melting the batches for about 1–2 days at 900°–950° C., the melts were quenched in a blast of compressed air to form homogeneous glass rods having diameters of about 7–10 mm and lengths of about 60–70 mm, which rods were annealed at about 400°–450° C. Table III also recites the differences in temperature between the crystallization temperature ($T_x$) and the transition temperature ($T_g$) expressed in terms of °C., and the $\tau$ expressed in terms of $\mu$sec.

TABLE II

| | 17 | 18 | 19 | 20 | 21 | 29 | 23 |
|---|---|---|---|---|---|---|---|
| $Ga_2S_3$ | 9.98 | 11.48 | 8.98 | 13.98 | 11.48 | 11.48 | 13.98 |
| $GeS_2$ | 85.0 | 86.0 | 86.0 | 83.5 | 86.0 | 86.0 | 81.0 |
| $La_2S_3$ | 5.0 | — | — | — | — | — | — |
| $Na_2S$ | — | 2.5 | 5.0 | — | — | — | — |
| $K_2S$ | — | — | — | 2.5 | — | — | — |
| $Ag_2S$ | — | — | — | — | 2.5 | — | — |
| CaS | — | — | — | — | — | 2.5 | 5.0 |
| $Pr_2S_3$ | 0.02 | 0.02 | 0.02 | 0.02 | 0.02 | 0.02 | 0.02 |
| $T_x$—$T_g$ | — | 139 | 169 | 157 | 142 | 160 | 152 |
| $\tau$ | 278 | 316 | 234 | — | — | 304 | — |
| | 24 | 25 | 26 | 27 | 28 | 29 | 30 |
| $Ga_2S_3$ | 13.98 | 11.48 | 8.98 | 13.98 | 9.31 | 11.48 | 13.98 |
| $GeS_2$ | 83.5 | 86.0 | 86.0 | 78.5 | 86.0 | 86.0 | 81.0 |
| CdS | 2.5 | — | — | — | — | — | — |
| SnS | — | 2.5 | 5.0 | 7.5 | — | — | — |
| $In_2S_3$ | — | — | — | — | 4.67 | — | — |
| BaS | — | — | — | — | — | 2.5 | 5.0 |
| $Pr_2S_3$ | 0.02 | 0.02 | 0.02 | 0.02 | 0.02 | 0.02 | 0.02 |
| $T_x$—$T_g$ | 119 | 130 | 105 | 136 | 151 | 182 | 190 |
| $\tau$ | — | 340 | 304 | — | 306 | 298 | 288 |
| | 31 | 32 | 33 | 34 | 35 | 36 | 37 |
| $Ga_2S_3$ | 17.98 | 19.48 | 13.98 | 8.98 | 8.98 | 11.48 | 13.98 |
| $GeS_2$ | 75.0 | 70.0 | 81.0 | 86.0 | 86.0 | 81.0 | 75.78 |
| BaS | 7.5 | 10.0 | 2.5 | — | — | 5.0 | 5.0 |
| $BaCl_2$ | — | — | 2.5 | — | — | — | — |
| $As_2S_3$ | — | — | — | 5.0 | — | — | — |
| $Sb_2S_3$ | — | — | — | — | 5.0 | 2.5 | — |
| $GeSe_2$ | — | — | — | — | — | — | 5.22 |
| $Pr_2S_3$ | 0.02 | 0.02 | 0.02 | 0.02 | 0.02 | 0.02 | 0.02 |
| $T_x$—$T_g$ | 196 | 171 | 140 | 139 | 140 | 189 | 150 |
| $\tau$ | 285 | 267 | — | 312 | 336 | — | 297 |
| | 38 | 39 | 40 | 41 | 42 | 43 | 44 |
| $Ga_2S_3$ | 6.48 | 19.98 | 21.38 | 14.0 | 14.0 | 17.48 | 19.98 |
| $GeS_2$ | 86.0 | 65.0 | 64.3 | 76.0 | 76.0 | 75.0 | 70.0 |
| BaS | 7.5 | 15.0 | — | 10.0 | 10.0 | 5.0 | 5.0 |
| $BaCl_2$ | — | — | — | — | — | 2.5 | 5.0 |
| $BaF_2$ | — | — | 14.3 | — | — | — | — |
| Excess S | — | — | — | 20.0 | 10.0 | — | — |
| $Pr_2S_3$ | 0.02 | 0.02 | 0.02 | — | — | 0.02 | 0.02 |
| $T_x$—$T_g$ | 126 | 169 | 142 | 232 | — | 172 | 115 |
| $\tau$ | 242 | — | — | — | — | 318 | 357 |

TABLE IIa

| | 17 | 18 | 19 | 20 | 21 | 22 | 23 |
|---|---|---|---|---|---|---|---|
| Ga | 6.05 | 7.11 | 5.64 | 8.52 | 7.11 | 7.16 | 8.65 |
| Ge | 25.76 | 26.63 | 27.04 | 25.46 | 26.63 | 26.83 | 25.08 |
| La | 3.03 | — | — | — | — | — | — |
| Na | — | 1.55 | 3.14 | — | — | — | — |
| K | — | — | — | 1.52 | — | — | — |
| Ag | — | — | — | — | 1.55 | — | — |
| Ca | — | — | — | — | — | 0.78 | 1.55 |
| Pr | 0.02 | 0.02 | 0.02 | 0.02 | 0.02 | 0.02 | 0.02 |
| S | 65.15 | 64.71 | 64.15 | 64.48 | 64.71 | 65.21 | 64.71 |
| | 24 | 25 | 26 | 27 | 28 | 29 | 30 |
| Ga | 8.59 | 7.16 | 5.73 | 8.72 | 5.67 | 7.16 | 8.65 |
| Ge | 25.65 | 26.83 | 27.48 | 24.49 | 26.22 | 26.83 | 25.08 |
| Cd | 0.77 | — | — | — | — | — | — |
| Sn | — | 0.78 | 1.60 | 2.34 | — | — | — |
| In | — | — | — | — | 2.85 | — | — |
| Ba | — | — | — | — | — | 0.78 | 1.55 |

TABLE IIa-continued

| | | | | | | | |
|---|---|---|---|---|---|---|---|
| Pr | 0.02 | 0.02 | 0.02 | 0.02 | 0.02 | 0.02 | 0.02 |
| S | 64.98 | 65.21 | 65.18 | 64.43 | 65.24 | 65.21 | 64.71 |
| | 31 | 32 | 33 | 34 | 35 | 36 | 37 |
| Ga | 10.67 | 12.11 | 8.59 | 5.47 | 5.47 | 7.11 | 8.65 |
| Ge | 22.90 | 21.21 | 24.88 | 26.22 | 26.22 | 25.08 | 25.08 |
| Ba | 2.29 | 3.03 | 1.54 | — | — | 1.55 | 1.55 |
| As | — | — | — | 3.05 | — | — | — |
| Sb | — | — | — | — | 3.05 | 1.55 | — |
| Pr | 0.02 | 0.02 | 0.02 | 0.02 | 0.02 | 0.02 | 0.02 |
| S | 64.12 | 63.64 | 63.44 | 65.24 | 65.24 | 64.71 | 61.47 |
| Cl | — | — | 1.54 | — | — | — | — |
| Se | — | — | — | — | — | — | 3.24 |
| | 38 | 39 | 40 | 41 | 42 | 43 | 44 |
| Ga | 4.24 | 12.29 | 12.47 | 7.80 | 9.41 | 10.59 | 11.93 |
| Ge | 28.15 | 20.00 | 18.76 | 21.18 | 25.54 | 22.73 | 20.90 |
| Ba | 2.45 | 4.62 | 4.17 | 2.79 | 3.36 | 2.27 | 2.99 |
| Pr | 0.02 | 0.02 | 0.01 | — | — | 0.02 | 0.01 |
| S | 65.14 | 63.08 | 56.24 | 68.23 | 61.69 | 62.88 | 61.19 |
| F | — | — | 8.34 | — | — | — | — |
| Cl | — | — | — | — | — | 1.52 | 2.99 |

As can be seen from Table II, the Pr-doped glasses in the ternary field $Ga_2S_3$—$GeS_2$—$MS_x$, where M is a modifying cation, exhibit excellent optical properties, as evidenced by τ values typically in excess of 300 μsec, and working ranges in excess of 100° C., with some compositions approaching 200° C.

It will be appreciated that the above procedures reflect laboratory practice only. That is, the batches for the inventive glasses can be melted in large commercial melting units and the melts formed into desired glass shapes employing commercial glass forming techniques and equipment. It is only necessary that the batches be heated to a sufficiently high temperature for a sufficient length of time to obtain a homogeneous melt, and the melt then cooled and simultaneously shaped at a sufficiently rapid rate to avoid the development of devitrification.

Based upon an overall balance of properties, the preferred inventive composition ranges consist essentially, expressed in terms of mole percent, of 5–26% $Ga_2S_3$, 58–89% $GeS_2$, 0.5–22% BaS and/or 0.5–15% $MS_x$, wherein M is at least one modifying cation selected from the group consisting of Ag, Ca, Cd, Sn, Sr, Y, and a rare earth metal of the lanthanide series, 0–6% $R_2S_3$, wherein R is at least one network forming cation selected from the group consisting of Al, As, In, and Sb, 0–5% total selenide, and 0–10% total chloride and/or fluoride, and wherein the sulfur and/or selenium content can vary between 90–120% of the stoichiometric value.

Example 31 constitutes the most preferred embodiment of the invention.

We claim:

1. A transparent glass exhibiting excellent transmission far into the infrared region of the electromagnetic radiation spectrum consisting essentially, expressed in terms of mole percent on the sulfide basis, of 40–80% $Ga_2S_3$, 0–35% $RX_x$, wherein R is at least one network forming cation selected from the group consisting of aluminum, antimony, arsenic, germanium, and indium, 1–50% $Ln_2S_3$, wherein Ln is at least one cation selected from the group consisting of a rare earth metal and yttrium, and 1–45% $MS_x$, wherein M is at least one modifying cation selected from the group consisting of barium, cadmium, calcium, lead, lithium, mercury, potassium, [silver,] sodium, strontium, thallium, and tin, and 0–10% total chloride and/or fluoride.

2. A transparent glass according to claim 1 which, when doped with praseodymium in an amount equivalent to at least 0.005% $Pr_2S_3$, exhibits a τ value greater than 200 μsec.

3. A transparent glass exhibiting excellent transmission far into the infrared region of the electromagnetic radiation spectrum consisting essentially, expressed in terms of mole percent, of 5–30% $Ga_2S_3$, 0–10% $R_2S_3$, wherein R is at least one network forming cation selected from the group consisting of aluminum, antimony, and indium, 55–94.5% $GeS_2$, 0.5–25% $MS_x$, wherein M is at least one modifying metal cation selected from the group consisting of barium, [cadmium,] calcium, [lead, lithium,] mercury, [potassium, sodium,] strontium, [thallium,] tin, yttrium, and a rare earth metal of the lanthanide series *selected from the group consisting of lanthanum, cerium, praseodymium, neodymium, promethium, samarium, gadolinium, terbium, dysprosium, holmium, erbium, thulium, ytterbium, and lutetium*, 0–10% total selenide, 0–25% total chloride and/or fluoride, and wherein the sulfur and/or selenium content can vary between 85–125% of the stoichiometric value.

4. A transparent glass according to claim [3] *16* also containing up to an amount of selenium equivalent to 10% $GeSe_2$, but wherein the ratio Se:Se+S is less than 0.1.

5. A transparent glass according to claim [3] *16* which, when doped with praseodymium in an amount equivalent to at least 0.005% $Pr_2S_3$, exhibits a τ value greater than 300 μsec.

6. A transparent glass according to claim [3] *16* wherein the difference between the temperature of the onset of crystallization and the transition temperature is at least 120° C.

7. A transparent glass according to claim 3 consisting essentially of 5–26% $Ga_2S_3$, 58–89% $GeS_2$, 0.5–22% BaS and/or 0.5–15% $MS_x$, wherein M is at least one modifying cation selected from the group consisting of calcium, [cadmium,] strontium, tin, yttrium, and a rare earth metal of the lanthanide series *selected from the group consisting of lanthanum, cerium, praseodymium, neodymium, promethium, samarium, gadolinium, terbium, dysprosium, holmium, erbium, thulium, ytterbium, and lutetium*, 0–6% $R_2S_3$, wherein R is at least one network forming cation selected from the group consisting of aluminum, antimony, and indium, 0–5% total selenide, and 0–10% total chloride and/or fluoride, and wherein the sulfur and/or selenium content can vary between 90–120% of the stoichiometric value.

8. In a waveguide structure comprising a core glass demonstrating a high refractive index surrounded by a cladding glass demonstrating a lower refractive index, the improvement comprising a core glass consisting of a lanthanum gallium sulfide glass and a cladding glass consisting of lanthanum gallium sulfide glass wherein calcium has replaced a sufficient proportion of the lanthanum to lower the refractive index thereof to impart a sufficient difference between the refractive index of said core glass and said cladding glass to achieve an appropriate numerical aperture in said waveguide structure.

9. In a waveguide structure comprising a core glass demonstrating a high refractive index surrounded by a cladding glass demonstrating a lower refractive index, the improvement comprising a cladding glass consisting of a lanthanum gallium sulfide glass and a core glass consisting of a lanthanum gallium sulfide glass wherein gadolinium has replaced a sufficient proportion of the lanthanum to raise the refractive index thereof to impart a sufficient difference between the refractive index of said core glass and said cladding glass to achieve an appropriate numerical aperture in said waveguide structure.

10. In a waveguide structure comprising a core glass demonstrating a high refractive index surrounded by a cladding glass demonstrating a lower refractive index, the improvement comprising a core glass consisting of a barium-modified, germanium gallium sulfide glass and a cladding glass also consisting of a barium-modified, germanium gallium sulfide glass, but wherein the barium content of said core glass is sufficiently higher than the barium content of said cladding glass to impart a sufficient difference between the refractive index of said core glass and said cladding glass to achieve an appropriate numerical aperture.

*11. A transparent glass exhibiting excellent transmission far into the infrared region of the electromagnetic radiation spectrum consisting essentially, expressed in terms of mole percent, of 5–30% $Ga_2S_3$, 0–10% $R_2S_3$, wherein R is at least one network forming cation selected from the group consisting of aluminum, antimony, and indium, 55–94.5% $GeS_2$, 0.5–25% trivalent europium sulfide, 0–10% total selenide, 0–25% total chloride and/or fluoride, and wherein the sulfur and/or selenium content can vary between 85–125% of the stoichiometric value.*

*12. A transparent glass according to claim 11 also containing up to an amount of selenium equivalent to 10% $GeSe_2$, but wherein the ratio Se:Se+S is less than 0.1.*

*13. A transparent glass according to claim 11 which, when doped with praseodymium in an amount equivalent to at least 0.005% $Pr_2S_3$, exhibits a $\tau$ value greater than 300 $\mu$sec.*

*14. A transparent glass according to claim 11 wherein the difference between the temperature of the onset of crystallization and the transition temperature is at least 120° C.*

*15. A transparent glass according to claim 3, wherein M is selected from the group consisting of barium, calcium, strontium, tin, yttrium, and a rare earth metal of the lanthanide series selected from the group consisting of lanthanum, cerium, praseodymium, neodymium, promethium, samarium, gadolinium, terbium, dysprosium, holmium, erbium, thulium, ytterbium, and lutetium.*

*16. A transparent glass exhibiting excellent transmission far into the infrared region of the electromagnetic radiation spectrum consisting essentially, expressed in terms of mole percent on the sulfide basis, of 40–80% $Ga_2S_3$, 0–35% $RS_x$, wherein R is at least one network forming cation selected from the group consisting of aluminum, antimony, arsenic, germanium, and indium, 1–50% $Ln_2S_3$, wherein Ln is at least one cation selected from the group consisting of a rare earth metal and yttrium, and 1–45% $MS_x$, wherein M is at least one modifying cation selected from the group consisting of barium, cadmium, calcium, lead, strontium, thallium, and tin, and 0–10% total chloride and/or fluoride.*

*17. A transparent glass according to claim 16 which, when doped with praseodymium in an amount equivalent to at least 0.005% $Pr_2S_3$, exhibits a $\tau$ value greater than 200 $\mu$sec.*

* * * * *